Patented Sept. 2, 1952

2,609,392

UNITED STATES PATENT OFFICE 2,609,392

CINNAMYL QUATERNARY AMMONIUM COMPOUNDS

Frank S. Crossley, Collingdale, Pa., assignor to Sharp & Dohme, Incorporated, Philadelphia, Pa., a corporation of Maryland No Drawing. Application April 27, 1950, Serial No. 158,590

6 Claims. (Cl. 260—567.6)

This invention relates to antiseptic and germicidal compounds, and more particularly to quaternary ammonium compounds having these properties, and having the general formula:

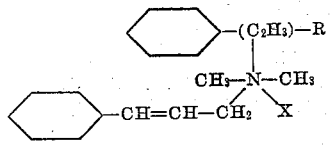

in which R is an aliphatic radical containing from 8 to 12 carbon atoms. R can be a normal alkyl chain, or it can contain a terminal cyclohexyl radical. X is a chlorine, iodine or bromide.

A feature of the invention resides in the discovery that the presence of the cinnamyl radical in the compounds unexpectedly enhances its bactericidal action. Compounds of a somewhat analogous structure have been known, but they have not included the cinnamyl radical of this invention.

Aqueous solutions of these compounds are valuable as antiseptics and germicides. For example, they may be used as mouth washes and for topical application. Due to the unusually high activity of the compounds, very dilute aqueous solutions may be used and they possess the consequent distinct advantage of lacking a strong taste or odor.

The compounds of the invention may be made by starting with the readily obtainable alkylbenzene having a primary amino group attached to the α or β carbon, wherein the aliphatic radical has from 10 to 14 carbon atoms. As mentioned above in defining the invention, the aliphatic radical may be a straight chain or may have a terminal cyclohexyl group.

This primary amine is converted to the corresponding tertiary amine by dimethylation with formic acid and formaldehyde according to known methods. One such method involves the addition of one mol of the selected amine dropwise to about 5 mols of formic acid (90%) to obtain the formate of the primary amine and then adding rapidly, during about a minute, about 2.2 mols of formaldehyde (36%). This should all take place with the reaction flask immersed in a cool water bath while the mixture is stirred continuously. The mixture is allowed to react without heating for an additional fifteen minutes, then cautiously warmed until a vigorous reaction commences as is evidenced by considerable foaming due to the evolution of carbon dioxide. The reaction is thereafter controlled to maintain gentle refluxing conditions by the application of heat or a cool water bath, as required. The vigorous reaction subsides in about fifteen minutes but the stirring should be continued and the flask should be heated on a steam bath for about an additional seven hours.

The tertiary amine is then isolated by conventional methods as follows: The mixture is diluted with water and made strongly alkaline with an excess of sodium or ammonium hydroxide solutions. The oil that separates is dissolved in benzene. The benzene solution is thoroughly washed with water and then benzene is removed by distillation. The tertiary amine is separated from the residue by fractional distillation in vacuum.

The tertiary amine is then quaternized by allowing it to react, preferably at room temperature, with an equimolecular amount of a cinnamyl halide until the resulting solid is completely soluble in water. The quaternary ammonium salt is then purified by crystallization from an appropriate solvent or solvent mixture.

These compounds were subjected to the United States Food and Drug Administration method of testing antiseptics and disinfectants, essentially as described at pages 2 through the middle of page 10 of the United States Department of Agriculture Circular No. 198 dated December 1931. The culture used was *Staphylococcus aureus* F. D. A. No. 209–A. The effective aqueous dilution represents the greatest dilution of one gram of the specific compound capable of killing the organism in ten minutes, but incapable of killing it in five minutes. This follows the explanation contained between the two tables on page 8 of the Circular No. 198. Tests are made at 37° C.

As the tertiary amine, that is, the α-phenyl- or α-benzylalkyl dimethylamine, is readily made according to the above procedure or is obtainable commercially, the tertiary amines are employed as starting materials in the following examples.

EXAMPLE 1

*Alpha-phenyldecyl-dimethyl-cinnamyl-ammonium chloride*

To a glass jar is added 65.36 grams (0.25 mol) of alpha-phenyldecyl-dimethylamine and 38.15 grams (0.25 mol) of cinnamyl chloride. It was stoppered and allowed to stand at room temperature until a test portion of the solid product which is formed was completely soluble in water (about twenty days). The product has the formula:

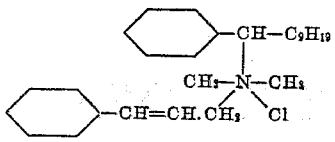

and melts at 73–74° C. (uncorrected).

The effective aqueous dilution when tested as above described was 1:80,000.

EXAMPLE 2

The corresponding iodide is made by using an equivalent amount of cinnamyl iodide instead of cinnamyl chloride.

EXAMPLE 3

Alpha-phenyldodecyl-dimethyl-cinnamyl-ammonium chloride

This compound was prepared as in Example 1, by reacting alpha-phenyldodecyl-dimethylamine 28.95 grams (0.1 mol), with cinnamyl chloride 15.25 grams (0.1 mol). The compound has the formula:

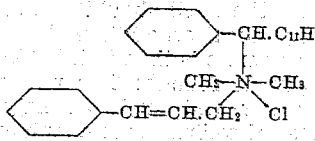

and melted at 83–84° C. (uncorrected).
Effective aqueous dilution 1:192,000.

EXAMPLE 4

The corresponding bromide is made by substituting an equivalent amount of cinnamyl bromide.

EXAMPLE 5

Alpha-phenyltetradecyl-dimethyl-cinnamyl-ammonium chloride

This compound was prepared as in Example 1, by reacting alpha-phenyltetradecyl-dimethylamine 6.5 grams (0.02 mol) with cinnamyl chloride 3.13 grams (0.02 mol). The compound has the formula:

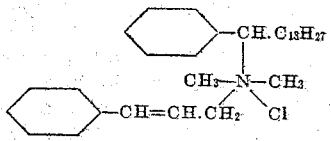

and melted at 76–77° C. (uncorrected).
Effective aqueous dilution 1:70,000.

EXAMPLE 6

The corresponding iodide is made by substituting an equivalent amount of cinnamyl iodide.

EXAMPLE 7

(1-phenyl-6-cyclohexyl-hexyl)-dimethyl-cinnamyl-ammonium chloride

This compound was prepared as in Example 1, by reacting (1-phenyl-6-cyclohexyl-hexyl)-dimethylamine 14.37 grams (0.05 mol) with cinnamyl chloride 7.63 grams (0.05 mol). The compound has the formula:

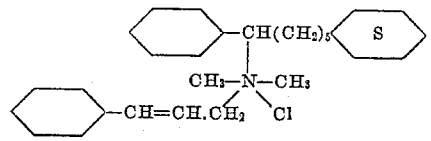

and melted at 137–138° C. (uncorrected).
Effective aqueous dilution 1:180,000.

EXAMPLE 8

The corresponding bromide is made by substituting an equivalent amount of cinnamyl bromide.

EXAMPLE 9

Alpha-benzyldodecyl-dimethyl-cinnamyl-ammonium chloride

This compound was prepared as in Example 1, by reacting alpha-benzyldodecyl-dimethylamine 14.17 grams (0.046 mol) with cinnamyl chloride 7.015 grams (0.046 mol). The compound has the formula:

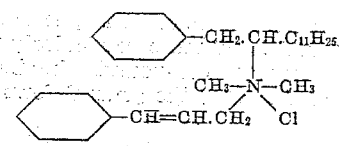

and was a soft, water soluble mass that gave correct analysis for the compound, but all attempts to crystallize the product from solvents failed.

Effective aqueous dilution 1:110,000.

EXAMPLE 10

Alpha-benzyltetradecyl-dimethyl-cinnamyl-ammonium iodide

By mixing equimolecular weights of alpha-benzyltetradecyl-dimethylamine and cinnamyl iodide, the compound having the following formula is obtained:

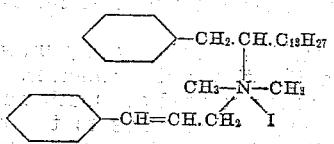

Instead of making the single compound of one of the above examples, a mixture of them may be made by simultaneous quaternization of a mixture of tertiary amines. For example, instead of the separate tertiary amines used as starting materials in Examples 1, 3 and 5, a mixture of these tertiary amines, such as is obtained from cocoanut oils, may be employed. The alkyl radicals present in cocoanut oils predominantly contain 10, 12 and 14 carbon atoms, such as are present in the so-called lorol compounds. These alkyl derivatives may be employed to make the primary amines, then the tertiary amines and finally the quaternary ammonium compounds of the invention, as a less costly mixture.

It will be noted that aqueous solutions of the compounds of the invention may be as dilute as 1:180,000 and still maintain satisfactory germicidal activity. This is to be contrasted with similar compounds which do not include the cinnamyl radical. Thus, the effective dilution of such compounds is as follows:

Alpha - phenyldodecyl - dimethyl-allyl-ammonium bromide_____ 1:36,000

Alpha - phenyldecyl - dimethyl-benzyl-ammonium chloride_____ 1:25,000
Alpha - phenyldecyl - dimethyl - cinnamyl- ammonium chloride_____ 1:80,000
(1 - phenyl - 6 - cyclohexyl - hexyl) -dimethyl - cinnamyl - ammonium chloride_____ 1:180,000

This application is a continuation in part of application Serial No. 2,324, filed January 14, 1948, by Moore and Crossley, now abandoned.

What is claimed is:

1. Quaternary ammonium compounds having the formula

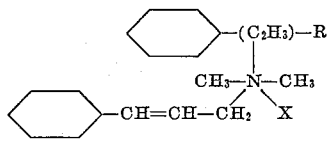

in which

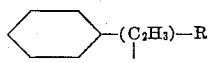

is a 1-phenyl-alkane, the

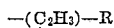

portion of which contains from 10 to 14 carbon atoms and is selected from the group consisting of normal alkyl chains and normal alkyl chains having attached to the terminal carbon atom an unsubstituted cyclohexyl radical, and X is selected from the group consisting of the chloride, iodide and bromide radicals.

2. Alpha-phenyldecyl - dimethyl-cinnamyl-ammonium chloride.

3. Alpha - phenyldodecyl - dimethyl-cinnamyl- ammonium chloride.

4. Alpha-phenyltetradecyl-dimethyl-cinnamyl- ammonium chloride.

5. (1-phenyl-6-cyclohexyl) - dimethyl - cinnamyl-ammonium chloride.

6. Alpha-benzyldodecyl - dimethyl - cinnamyl- ammonium chloride.

FRANK S. CROSSLEY.

REFERENCES CITED

The following references are of record in the file of this patent:

UNITED STATES PATENTS

| Number | Name | Date |
| --- | --- | --- |
| 2,276,587 | Mettler et al. | Mar. 17, 1942 |

OTHER REFERENCES

Voigt et al., "Chem. Zent." 1940 (II), p. 655.